3,390,079
METHOD OF HOT EXTRUSION OF METALLIC ARTICLES

Masaru Utakoji, 15 1-chome, Urakaze-cho, Imazu, Nishinomiya, Japan, and Minoru Imaoka, 518 Kita-1-chome, Kaijin-cho, Funabashi, Japan
Filed July 8, 1965, Ser. No. 470,355
Claims priority, application Japan, July 20, 1964, 39/41,450
5 Claims. (Cl. 252—12)

---

ABSTRACT OF THE DISCLOSURE

A method of extrusion of metallic articles by using a solid lubricant of disk-shape comprising at least first and second solid lubricant layers having different viscosities, the first solid lubricant layer consisting of a glass composition containing more than 80 mol percent $B_2O_3$ and $SiO_2$, less than 20 mol percent of $Na_2O$ and CaO, and 2.5 to 10 mol percent of $Al_2O_3$, while the second solid lubricant layer is a conventional glass lubricant having a higher viscosity and a slower rate of softening as compared with said first solid lubricant layer.

---

This invention relates to a method of hot extrusion of metallic articles, more particularly a method of extruding metallic section characterized in that a disk-shaped lubricant made by laminating at least two layers of different kinds of glasses having different physical properties at a certain extruding temperature is inserted between a die of an extruder and a billet to be extruded in order to provide an improved continuous lubrication by melting said disk-shaped lubricant successively with the heat of said billet as the extrusion proceeds starting from its outermost layer and a novel glass lubricant suitable for said disk lubricant.

In general, it is necessary to provide proper lubrication to the contact surface of the billet with extruding tools, such as dies, in order to carry out a hot extrusion successfully, and the lubricant for such purpose has been selected from the group consisting of molybdenum disulphide, graphite, glasses, etc., depending on conditions for each extruding operation.

It has been known that lubrication of such contact surface can be done by filling a space in the extruder defined by mutually facing die and billet to be extruded with such lubricating substances as glasses, pulverized glasses, glass fibres, molybdenum disulphide, etc. and melting them during extruding operation. Also known is a method to provide an excellent lubricating effects by inserting a disk lubricant, which is made by solidifying one or a mixture of said lubricating substances with or without binder, into a container of the extruder against the die located therein.

Said conventional methods of lubrication for extrusion have a disadvantage in that the surface of the extruded product is quite often flawed deeply, especially in the beginning of each extruding operation, which sometimes renders the extruded products into unusable scraps. Such flaws are caused due to the fact that said solid lubricant cannot be heated sufficiently by the heat of the billet in the beginning of an extruding operation, and hence the viscosity of the lubricant is kept too high for proper lubricating action, thereby the supply of lubricant to the contact surface of the billet with the die is insufficient and possibly failed at a certain instant of extruding operation causing partial seizure or scratching between the billet and the die. Such flaws in the top portion of the extruded product are liable to occur more frequently in extruding metals having a low workable temperature and a low resistance against deformation such as titanium, zirconium, tantalum, etc., compared with those having a high workable temperature and a high resistance against deformation.

If a lubricant having a low viscosity is used, the extruding operation will be carried out very smoothly in the beginning, however, the supply of the lubricant is hardly maintained at a proper level throughout the entire extruding operation, and said flaws on the extruded product due to seizure may occur in the latter part toward the end of the extruding operation. In such a case, the lower the viscosity of the lubricant at the extruding temperature and also the temperature coefficient of the viscosity of the lubricant are, the greater the chance of causing said flaws will be.

It is apparent from the foregoing that in order to improve the quality of top portion of the extruded product, i.e. to prevent the flaws or eccentricity of the product due to seizures at the top portion thereof, application of lubricants to be softened quickly or lubricant having a low viscosity is desirable. On the other hand, in order to retain the lubricant on the contact surface of the die with the billet throughout the entire extruding operation until the end thereof, it is necessary to apply lubricants having a certain high viscosity and slow softening point and capable of retaining constant level of viscosity for the range of temperature variation occurring during the extruding operation.

It is hardly possible to obtain a single lubricant possessing said two incompatible physical properties.

The principal object of the invention is to obviate said difficulties in conventional methods of extrusion and provide a novel method of obtaining excellent surface conditions of extruded product and a high yield rate in extruding various kinds of coppers, titanium, titanium alloys, nickel, nickel alloys, etc., by applying most suitable lubrication to dies and billets for such extrusion.

According to the invention, said difficulties are obviated by using different lubricants at different steps in an extruding operation so as to apply proper and continuous lubrication throughout the entire extruding operation, for example in the case of using glass lubricants in the main, two kinds of glasses consisting of kind A having a low viscosity suitable for the initial portion of extruding operation and kind B having a higher viscosity suitable for intermediate and final portions of said extruding operation are shaped into a disk having two layers made of said A and B glasses respectively, and the laminated disk-shaped lubricant, so-called as a pad, thus prepared is inserted into the container of an extruder in such a manner that the layer of the lubricant which comprises said B glass makes contact with the die of the extruder, thereby when a preheated billet placed in the container is extruded, the billet is at first brought into contact with a glass layer of the disk lubricant to heat and melt the A glass for lubricating the contact surface between the die and the billet in the beginning of the extrusion, thereafter as the extruding operation proceeds the A glass layer of the disk lubricant will be used up and B glass layer will be melted successively to lubricate the die and the billet during the rest of the extruding operation, thus proper lubrication is insured throughout the entire extruding operation. It is of course permissible to use more than two layers of lubricants and accordingly more than two kinds of lubricants in shaping said disk lubricant.

For a better understanding of the invention, reference is taken to the accompanying drawings, in which—

Figure 1:
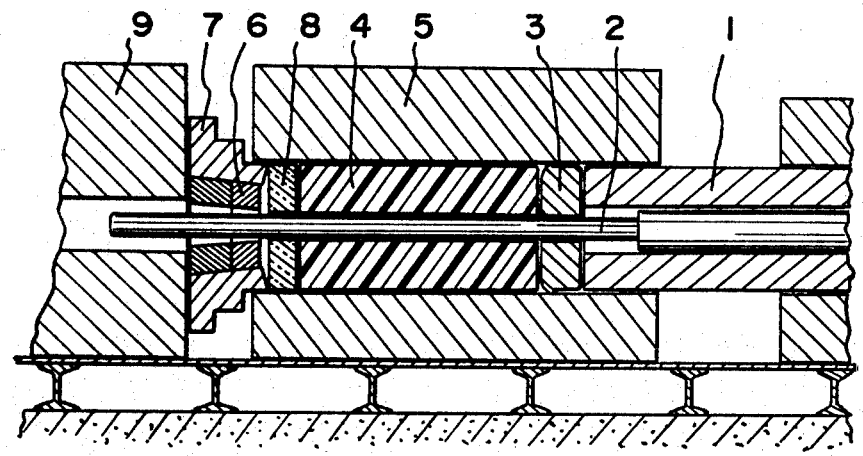
FIGS. 1 and 2 are longitudinal sectional views of a conventional extruder illustrating conditions prior to and during hot extrusion of a hollow metallic section respectively by using a solid conventional lubricant.
Figure 2:
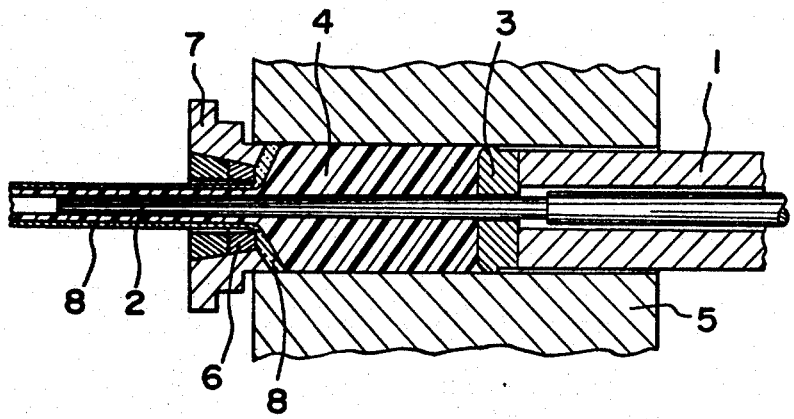

Referring to FIGS. 1 and 2 showing one of typical conventional methods of extrusion, reference numeral 8 designates a disk lubricant formed by solidifying glass powders or a mixture of glass powders, graphite, molybdenum disulphide and others, 6 a die, 7 a die holder, 4 a billet placed in a container 5, and 1 shows a ram of the extruder, 3 a dummy block thereof, 2 a mandrel penetrating through the billet 4, and 9 a die stop locking device assembly.

As shown in FIG. 2, if the preheated billet 4 is pressed by the dummy block 3 in the container 5 at an elevated temperature, the glass lubricant 8 is gradually melted from its surface to produce lubricating films covering the proximities of the opening of the die and the surface of the billet to be extruded by passing through said opening of the die.

Figure 8:
FIG. 8 is a photograph showing surface conditions of titanium pipe extruded according to a conventional method.

As mentioned in the foregoing, such a conventional method is liable to cause flaws on the surface of the extruded products due to insufficient melting of said solid disk lubricant at least in the beginning of extruding operation resulting in possible interruptions in lubrication. FIG. 8 shows such flaws caused on the surface of the first 500 mm. in length of a titanium tube extruded at 850° C. by using a disk lubricant 8 made by soldifying glass powders. Said lubricant has a viscosity of 400 poises at 850° C.

Figures 6, 7:
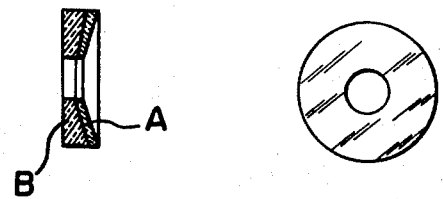
FIGS. 6 and 7 are a sectional elevation and a side view of FIG. 6 respectively of an embodiment of the disk lubricant of the invention to be used in the extruding operation.

FIGS. 6 and 7 illustrate an example of above mentioned laminated disk lubricant, wherein the portion A is made of a glass having a certain value of viscosity at a temperature for extruding, say 200 poises at 800° C., whilst the portion B of the disk is made of another kind of glass powders having a different level of viscosity, say 1,000 poises at said temperature of extruding operation. According to the invention said glass powders having different viscosities at the same temperature are solidified together into a unit disk either with or without addition of binder, and then thus shaped disks consisting of A and B glasses are laminated and joined together into the shape as shown in FIGS. 6 and 7 by applying adhesives such as water glass if the lubricants are water-insoluble, or epoxy resin if water-soluble. It is also possible to form said disk by placing B glass powders at first in a vessel having the desired disk shape, and then filling A glass powders in said vessel over said B glass, thereafter solidifying said glass powders together by pressing them simultaneously. The disk lubricant consisting of glasses having the above mentioned values of viscosity proved to be excellent in extruding a titanium billet into a pipe.

The A glass to be used in said disk lubricant of the invention should have a certain low level of viscosity and temperature coefficient of viscosity at a considerably lower melting point compared with that of conventional glass lubricant, and in addition it should have such properties as not to effloresce and absorb moisture quickly. The inventors carried out a quite number of studies on such special glasses.

Though in the foregoing description referring to the drawings the invention is shown as applied to the hot extrusion of hollow metallic sections, yet it should be noted that the invention can be equally applied to the hot extrusion of any shape of solid metallic sections by slightly changing the extruder without a mandrel.

It was found by experiments that as the content of $Na_2O$ is increased in a $B_2O_3$ glass, the temperature coefficient of the viscosity of the glass is increased, which means that the network structure of the glass is disintegrated as the content of the modifier is increased and the glass structure is gradually changed into a crystalline structure.

In order to obtain a glass having a comparatively low melting point, a small temperature coefficient of viscosity and a property not to effloresce or absorb moisture quickly in air, it was found at first that the melting point can be lowered by adding network formers having low melting points such as boric acid anhydride $B_2O_3$ and phosphoric acid anhydride $P_2O_5$ or adding a considerable amount of a modifier capable of lowering the melting point greatly such as lead oxide PbO. However, an addition of the modifier in quantity results in an increase in the temperature coefficinet of viscosity, and phosphoric acid anhydride is highly volatile and hydroscopic, therefore, such methods are not suitable for the object of the invention.

It was also found that the glass of $B_2O_3$ alone is about to satisfy such conditions as a low melting point, a low viscosity at the melting point, and a low temperature coefficient of viscosity, however, such a glass is not suitable for practical use due to the fact that such glass is not water resisting and effloresces quickly and, in addition, is beclouded easily. The inventors tried to improve the efflorescence property of the $B_2O_3$ glass while retaining its viscosity property and discovered that the $B_2O_3$-$SiO_2$-$Na_2O_3$ glasses, particularly glasses having a high content of $B_2O_3$, are possessed of such desired properties.

According to the results of the tests carried out by the inventors, an addition of $SiO_2$ to $B_2O_3$ causes a slight increase in viscosity and water resistivity thereof. It has been already disclosed that the addition of modifier $Na_2O$ results in an increase in temperature coefficient of viscosity. The inventors have found that even if a small quantity of $Na_2O$ is added to glass network formers, its effects on the viscosity of the glass are considerable, however, the effects of adding $SiO_2$ is not so great.

On the other hand, it is generally believed that the preferable viscosity of glass lubricants for metal processing, e.g. extrusion at an elevated temperature is about $10^2$–$10^3$ poises at the extruding temperature, besides it is desirable to have a low temperature coefficient of viscosity.

Accordingly, the inventors found that if a suitable amount of alumina $Al_2O_3$ is added as an effective ingredient for improving the water resisting property in said basic glasses having a high content of $B_2O_3$, the above requirements for glass lubricants can be attained. In this case, it is necessary to minimize the alkaline content and add a modifier in substantially chemical equivalent to the $Al_2O_3$ to be added, and hence it is preferable to substitute a part of $Na_2O$ with CaO.

Thus, the most suitable composition for the A glass lubricants has been selected according to the invention as follows:

A glass having a low melting point and consisting of at least 80 mol percent of a combination of $B_2O_3$ and $SiO_2$, less than 30 mol percent of $SiO_2$, less than 20 mol percent of a combination of $Na_2O$ and CaO, and either 2.5 to 10 mol percent of $Al_2O_3$ provided that the content of $SiO_2$ being less than 5 mol percent or 0 to 7.5 mol percent of $Al_2O_3$ provided that said content of $SiO_2$ being 5 to 30 mol percent.

For instance, a glass according to the invention, which consists of 82.0 mol percent of $B_2O_3$, 3.5 mol percent of $Na_2O$, 7.5 mol percent of $SiO_2$, 5.0 mol percent of $Al_2O_3$, and 2.0 mol percent of CaO, has a viscosity of 280 poises at 850° C., and 2,300 poises at 700° C., and the viscosity-temperature curve of the glass is similar to that of $B_2O_3$ alone while the water resisting property of the glass is greatly improved.

Another glass of the invention, which consists of 89.5 mol percent of $B_2O_3$, 3.5 mol percent of $Na_2O$, 5.0 mol percent of $Al_2O_3$, and 2.0 mol percent of CaO, has a viscosity of 190 poises at 850° C. and 1,030 poises at 700° C., and the viscosity-temperature curve of the glass is similar to that of the above example while the water resisting property of the glass is slightly inferior to that of the above example. However, when said glass was mixed with water and water glass, there was no visible dissolution of said glass.

The B glass to be used in the base portion of the disk lubricant as shown in FIGS. 6 and 7 is required to have a comparatively high viscosity, comparatively slow softening and to be capable of retaining a certain range of viscosity for different temperatures.

Such B glasses can be selected from conventional glass lubricants. For instance, a glass consisting of 45 mol percent of $SiO_2$, 6.5 mol percent of CaO, 4.5 mol percent of MgO, 19 mol percent of $B_2O_3$, and 25 mol percent of $K_2O_3$, which has a viscosity of 8,000 to 30,000 poises at the extruding temperature of 800° C., can be used as a B glass. Another example is a glass consisting of 34 mol percent of $SiO_2$, 7 mol percent of CaO, 5 mol percent of MgO, 16 mol percent of $Na_2O$, and 37 mol percent of $B_2O_3$, which has a viscosity of 1,000 to 2,000 poises at the extruding temperature of 800° C.

The voluminal ratio of the B portion of the disk lubricant to A portion thereof should be determined by considering the dimensions of the billet and the final shape required by the extruded product and various physical properties of the metal to be extruded, however, such voluminal ratio usually falls within a range from 10:1 to 10:3.

Number of the layers in said disk lubricant is not necessarily limited to two, but an additional layer of lubricant having different physical properties may be added between said A and B layers or at the back of said B layer. It is not necessary to provide a distinctive border surface between A and B layers but it is permissible to form a gradually changing intermediate layer consisting of the mixture of two kinds of glasses between said A and B layers in the process of shaping said disk lubricant.

Figure 3:
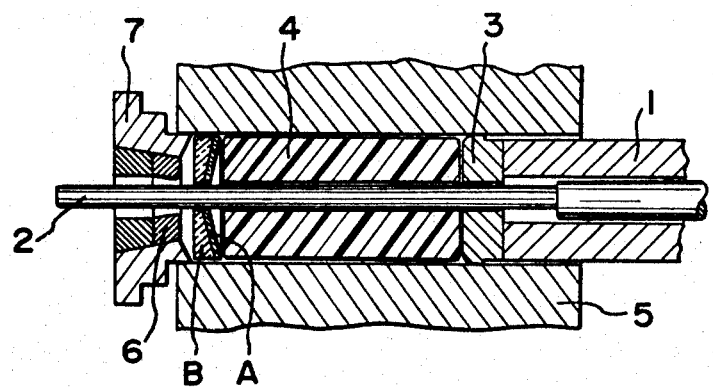
FIGS. 3 to 5 are longitudinal sectional views of the extruding machine illustrating different steps respectively of an extruding operation according to the invention.
Figure 4:
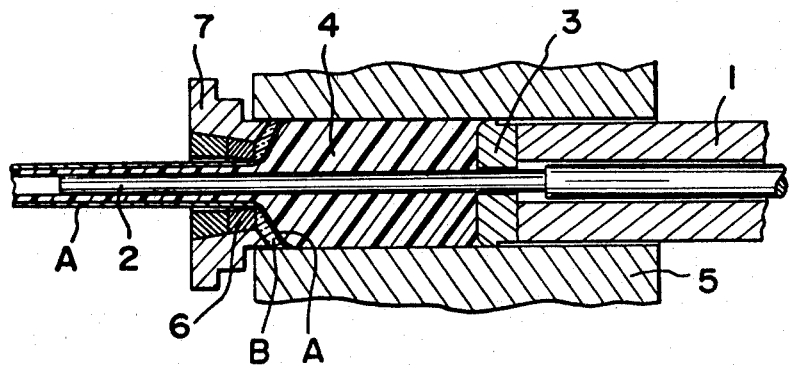
Figure 5:
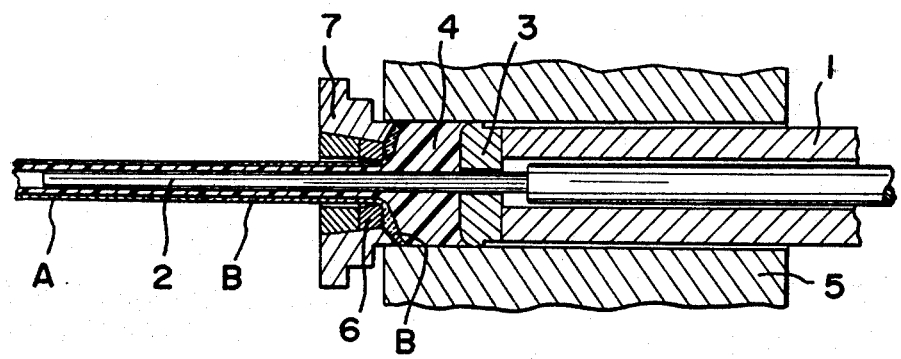

FIGS. 3 to 5 show different steps in extruding a titanium article by using said laminated disk lubricant, wherein A and B are lubricants, 6 a die, 7 a die holder, 4 a billet held by a container 5, 1 a ram of the extruder, 3 a dummy block, 2 a mandrel. In the conditions as shown by FIG. 3, the mandrel 2 is pushed through the billet 4 by way of a hole pierced therein and further extended through a hole of the die 6, and the billet 4 is about to be extruded and the front end of the billet is just about to be brought into contact with the A portion of the disk lubricant A and B. Prior to the conditions as shown by FIG. 3, the preheated container, mandrel and the entire surface of the billet to be extruded should be lubricated according to a known procedure. FIG. 4 shows the condition immediately after the extruding operation is actually launched. The A portion of the disk lubricant, which has a viscosity of 200 poises at the extruding temperature of 800° C., is at first melted from its outer surface urged by the billet and the glass thus molten is led to the hole of the die in order to wet and lubricate the contact surface between the die and the billet quickly and smoothly. As the extruding operation proceeds, the A portion of the disk lubricant is being consumed completely and then the B portion thereof will begin to melt and lubricate the die and the billet. FIG. 5 represents a step in the intermediate or later stage of the extruding operation, wherein the A portion of the disk lubricant is already consumed completely, and the B portion thereof having a viscosity of 1,000 poises at the same extruding temperature begins to melt and flow to the die at a constant rate in order to provide proper lubrication until the end of the extruding operation by maintaining a substantially constant viscosity of the lubricant throughout intermediate and last stages of the extrusion.

It is apparent from the foregoing that according to the invention, during the initial stage of the extruding operation, such portion of the disk lubricant which has a lower viscosity at a certain extruding temperature than the rest thereof is melted at first and flowed to the contact surface of the die with the billet to provide effective lubrication, and in the intermediate toward the very last stage of the extrusion, the base portion of the disk lubricant is melted successively to provide most suitable lubrication at a substantially constant viscosity until the completion of the extrusion.

Figure 9:
FIGS. 9 and 10 are photographs showing surface conditions of a titanium pipe extruded according to the method of the invention.
Figure 10:

FIGS. 9 and 10 show the surface conditions of a titanium tube extruded by using the disk lubricant of the invention, which show that excellent flawless surface is obtained throughout the entire length of the extruded product.

According to the method of the invention, for instance in an extrusion of a titanium pipe, the yield rate in the final products is raised by about 20% due to the considerable reduction in the rate of causing flaws on the surface of the products at least in the initial stage of the extruding operation, and the rate of causing eccentricity in the final products is reduced by about 17% due to the fact that the excellent lubricating action of the disk lubricant of the invention reduces the apparent resistance of the billet against deformation and thus enables smooth operation in extruding processes. Thus the method of the invention contributes greatly to the art of hot extrusion.

The invention has been described by an example of titanium billet in the foregoing, however, the method of the invention can be also applied to the extrusion of other metals and alloys having comparatively low resistances against work deformation and to be worked at a lower temperature, such as zirconium, tantalum, etc., with considerable advantages over conventional methods, such as elimination of various difficulties inherent to the latter methods. The method of invention is also applicable to extrusion of other substances not mentioned above if so desired.

The materials to form at least two different layers of the laminated disk lubricant are not limited to glass only, and for example solidified products of glasses, graphite, molybdenum disulphide, etc., or mixtures thereof can be also used for the disk lubricant.

What we claim is:

1. A method for hot extrusion of metallic articles by using an extrusion press, comprising the steps of forming a disk-shaped solid lubricant having a first homogeneous layer of low viscosity lubricant and a second homogeneous layer of higher viscosity lubricant, inserting said disk-shaped solid lubricant between a billet to be extruded and an extruder die of said press, said disk-shaped solid lubricant being inserted such that said first layer of low viscosity is placed adjacent said billet and said second layer of higher viscosity is placed adjacent said extruder die and extruding said billet whereby said low viscosity lubricant layer melts to lubricate the contact surface between the die and billet at the beginning of the extrusion and the higher viscosity layer lubricates the die and billet during the remainder of the extrusion process after the low viscosity layer has been used up.

2. A disk-shaped solid lubricant for hot extrusion of metallic articles, comprising at least a first layer to be placed adjacent a billet being extruded and a second layer to be placed adjacent an extruding die, the viscosity of said first layer being lower than that of said second layer in a temperature range suitable for said hot extrusion, said first layer comprising a glass composition consisting of more than 80 mol percent in the total sum of $B_2O_3$ and $SiO_2$, content of said $SiO_2$ being less than 30 mol percent based on the entire glass composition, less than 20 mol percent in the total sum of $Na_2O$ and CaO, 2.5 to 10 mol percent of $Al_2O_3$ in the case when said content of $SiO_2$ is less than 5 mol percent, and said second layer is a conventional glass lubricant having a higher viscosity and a slower rate of softening as compared with said first solid lubricant layer.

3. A disk-shaped solid lubricant as in claim 2 wherein said first layer has a viscosity of less than about 350 poises at 850° C.

4. A disk-shaped solid lubricant as in claim 2 wherein said first layer comprises a glass composition consisting of 82.0 mol percent of $B_2O_2$, 3.5 mol percent of any $Na_2O$, 7.5 mol percent of $SiO_2$, 5.0 mol percent of $Al_2O_3$, and 2.0 mol percent of CaO.

5. A disk-shaped solid lubricant as in claim 2 wherein said first layer comprises a glass composition consisting of 89.5 mol percent of $B_2O_3$, 3.5 mol percent of $Na_2O$, 5.0 mol percent of $Al_2O_3$, and 2.0 mol percent of CaO.

References Cited

UNITED STATES PATENTS

| | | | |
|---|---|---|---|
| 476,145 | 5/1892 | Howson | 252—10 |
| 787,752 | 4/1905 | Griffen | 252—10 |
| 2,233,206 | 2/1941 | Frederick | 252—10 |
| 3,021,594 | 2/1962 | Clatot et al. | 252—12.6 |
| 3,059,769 | 10/1962 | Frost | 252—12 |
| 3,140,779 | 7/1964 | Dalton et al. | 252—12 |
| 3,242,076 | 3/1966 | Hagan | 252—12 |

FOREIGN PATENTS

| | | |
|---|---|---|
| 712,007 | 7/1954 | Great Britain. |

DANIEL E. WYMAN, *Primary Examiner.*

I. VAUGHN, *Assistant Examiner.*